United States Patent
Wolfson et al.

(10) Patent No.: US 12,298,813 B2
(45) Date of Patent: May 13, 2025

(54) MULTIPLE PERIPHERAL CASE AND PORTABLE COMPUTING DEVICE STAND

(71) Applicant: Logitech Europe S.A., Lausanne (CH)

(72) Inventors: Paul Benjamin Wolfson, Lausanne (CH); Julie Mareva Arrivé, London (GB); Maxence Frank Perret-Gentil, Lausanne (CH); Xia Jinjun, Suzhou (CN)

(73) Assignee: Logitech Europe S.A., Lausanne (CH)

( * ) Notice: Subject to any disclaimer, the term of this patent is extended or adjusted under 35 U.S.C. 154(b) by 172 days.

(21) Appl. No.: 17/877,052

(22) Filed: Jul. 29, 2022

(65) Prior Publication Data
US 2024/0004433 A1    Jan. 4, 2024

Related U.S. Application Data

(63) Continuation-in-part of application No. 29/844,539, filed on Jun. 29, 2022.

(51) Int. Cl.
*G06F 1/16* (2006.01)
*H04B 1/3877* (2015.01)
*H04B 1/3888* (2015.01)

(52) U.S. Cl.
CPC ......... *G06F 1/1656* (2013.01); *H04B 1/3877* (2013.01); *H04B 1/3888* (2013.01)

(58) Field of Classification Search
CPC ... H04B 1/3877; H04B 1/3888; G06F 1/1613; G06F 1/1628; G06F 1/1633; G06F 1/1643; G06F 1/1656; G06F 1/1684; G06F 1/169

See application file for complete search history.

(56) References Cited

U.S. PATENT DOCUMENTS

| | | |
|---|---|---|
| 585,595 A | 6/1897 | Roessle |
| 781,948 A | 2/1905 | Hegele |
| D127,370 S | 5/1941 | Froelich |
| D136,862 S | 12/1943 | Wollenberger |
| D201,663 S | 7/1965 | Binder |
| D266,172 S | 9/1982 | Fraser et al. |

(Continued)

FOREIGN PATENT DOCUMENTS

| | | |
|---|---|---|
| CA | 190068 S | 4/2021 |
| CN | 307294236 | 4/2022 |

OTHER PUBLICATIONS

"EHO Laptop Lap Pad", Amazon.com, Apr. 10, 2019, 12 pages.

(Continued)

*Primary Examiner* — Anthony Q Edwards
(74) *Attorney, Agent, or Firm* — Kilpatrick Townsend & Stockton LLP

(57) ABSTRACT

An integrated case and stand for holding at least two computer peripherals and providing a stand for a portable computing device. The integrated case and stand has a case body which includes a first compartment configured to hold a first computer peripheral and a second compartment configured to hold a second computer peripheral. A lid covers the first and second compartments in a closed position. The lid has at least a portion that rotates more than 90 degrees to form a stand, at an angle to the case body, for the portable computing device in an open position. A protrusion is mounted on one end of the lid to support the portable computing device in the open position.

19 Claims, 9 Drawing Sheets

(56) References Cited

U.S. PATENT DOCUMENTS

| | | | |
|---|---|---|---|
| D268,714 S | 4/1983 | Goedel | |
| D284,390 S | 6/1986 | Draddy | |
| D312,276 S | 11/1990 | Fisherman et al. | |
| D338,455 S | 8/1993 | Suge | |
| D372,495 S | 8/1996 | Godfrey et al. | |
| D383,492 S | 9/1997 | Siemon et al. | |
| D423,572 S | 4/2000 | Tedaldi et al. | |
| D426,262 S | 6/2000 | Humphrey | |
| D435,550 S | 12/2000 | Chu et al. | |
| 6,628,267 B2* | 9/2003 | Karidis | G06F 1/1626 178/18.03 |
| D535,292 S * | 1/2007 | Shi | D14/315 |
| D600,699 S | 9/2009 | Johnston et al. | |
| 8,077,151 B2* | 12/2011 | Morooka | G06F 1/1656 345/169 |
| D690,305 S | 9/2013 | Wen | |
| D727,332 S | 4/2015 | Hirsch | |
| D730,047 S | 5/2015 | Yi | |
| 10,372,169 B1* | 8/2019 | Ferren | G06F 1/1628 |
| 2001/0009500 A1 | 7/2001 | Selker | |
| 2002/0057552 A1 | 5/2002 | Dinkin | |
| 2007/0211415 A1* | 9/2007 | Seo | G06F 1/1628 361/807 |
| 2008/0024437 A1* | 1/2008 | Morooka | G06F 1/1679 345/156 |
| 2009/0178938 A1 | 7/2009 | Palmer | |
| 2010/0294909 A1* | 11/2010 | Hauser | B42D 9/00 248/456 |
| 2011/0180682 A1* | 7/2011 | Tarnutzer | A47B 23/043 248/447 |
| 2011/0267757 A1 | 11/2011 | Probst et al. | |
| 2012/0087100 A1 | 4/2012 | Ku | |
| 2013/0271373 A1* | 10/2013 | Milhe | G06F 1/1671 345/156 |
| 2014/0077669 A1* | 3/2014 | Choi | H05K 5/0004 312/223.1 |
| 2014/0262876 A1 | 9/2014 | Bates et al. | |
| 2014/0267050 A1* | 9/2014 | Spollen | G06F 1/1616 345/168 |
| 2015/0349831 A1 | 12/2015 | Young et al. | |
| 2016/0134322 A1 | 5/2016 | Lee et al. | |
| 2017/0009934 A1* | 1/2017 | van Hooft | G06F 1/1616 |
| 2017/0292302 A1* | 10/2017 | Tomky | F16M 13/005 |
| 2018/0039343 A1* | 2/2018 | Park | G06F 3/03545 |
| 2018/0329453 A1 | 11/2018 | Elias | G06F 1/169 |
| 2019/0021465 A1* | 1/2019 | Diebel | G06F 1/1626 |
| 2019/0121393 A1 | 4/2019 | Mos et al. | |
| 2019/0324574 A1* | 10/2019 | Schooley | G06F 1/1632 |
| 2020/0121046 A1 | 4/2020 | Buechin et al. | |
| 2021/0191473 A1* | 6/2021 | Kuo | G06F 3/03545 |
| 2021/0401140 A1 | 12/2021 | Rayeski et al. | |

OTHER PUBLICATIONS

"Logitech Desk Kit Stand", Amazon.com, Feb. 27, 2024, 12 pages.
U.S. Appl. No. 29/844,539, "Ex Parte Quayle Action", filed Jul. 31, 2024, 7 pages.
CN202230863620.3, "Notice of Decision to Grant", Sep. 12, 2023, 4 pages.
EM015006454-0001, "Office Action", Jan. 5, 2023, 3 pages.
EM015006454-0002, "Office Action", Jan. 5, 2023, 3 pages.

* cited by examiner

MULTIPLE PERIPHERAL CASE AND PORTABLE COMPUTING DEVICE STAND

CROSS-REFERENCES TO RELATED APPLICATIONS

This application claims priority to, and is a continuation-in-part of, design patent application No. 29/844,539, entitled "PRODUCTIVITY SURFACE," and filed on Jun. 29, 2022.

BACKGROUND OF THE INVENTION

Aspects of the present disclosure relate generally to electronic device cases and stands, and more particularly to cases and stands for computer peripheral devices, according to certain embodiments.

For mobile devices, it is desirable to be able to reproduce a desktop environment wherever there is a table or flat surface. One way this is done is to provide a cover for a table, with the cover converting into a stand for the tablet using certain hinges. One example is shown in Logitech U.S. Published Application No. 20160134322. See also Logitech U.S. Published Application No. 20140262876.

A variety of briefcases or cases have been designed specifically to hold a laptop computer, a tablet, or a smart phone. Some cases are also designed to function as a stand for an electronic device (see, e.g., Mos US Pub. No. 20190121393). It would be desirable to have a solution to both providing a case, and providing a desktop environment.

Unless otherwise indicated herein, the materials described in this section of the Specification are not prior art to the claims in this application and are not admitted to be prior art by inclusion in this section.

BRIEF SUMMARY OF THE INVENTION

Embodiments provide an integrated case and stand, or peripheral platform, for holding at least two computer peripherals and providing a stand for a portable computing device. The integrated case and stand has a case body which includes a first compartment configured to hold a first computer peripheral and a second compartment configured to hold a second computer peripheral. A lid covers the first and second compartments in a closed position. The lid has at least a portion that rotates more than 90 degrees to form a stand, at an angle to the case body, for the portable computing device in an open position. A protrusion is mounted on one end of the lid to support the portable computing device in the open position.

In one embodiment the lid is composed of two panels that are co-extensive for the length of one panel. A first panel has a support surface configured to hold the portable computing device. The support surface faces inward when the integrated case and stand is in the closed position. The support surface faces outward when the integrated case and stand is configured in the open position as a stand. A second panel has a hinge less than half the distance from a first edge of the first panel, the hinge allowing the portion of the first panel to pivot away from the second panel for the open position.

In one embodiment, one or more of the compartments of the integrated case and stand have a ridge on a bottom surface. The ridge is sufficient high to allow a user to push down on a first end of the first computer peripheral to lift a second end of the first computer peripheral so that it can be removed from the compartment. The computer peripheral is snuggly held in place in the compartment with retaining mechanisms mounted in a plurality of corners of the compartment. The retaining mechanisms are compressible pads in one embodiment. In one embodiment, the compartments are sized to snuggly fit a computer keyboard and a touchpad.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

DETAILED DESCRIPTION OF THE INVENTION

Figure 1A:
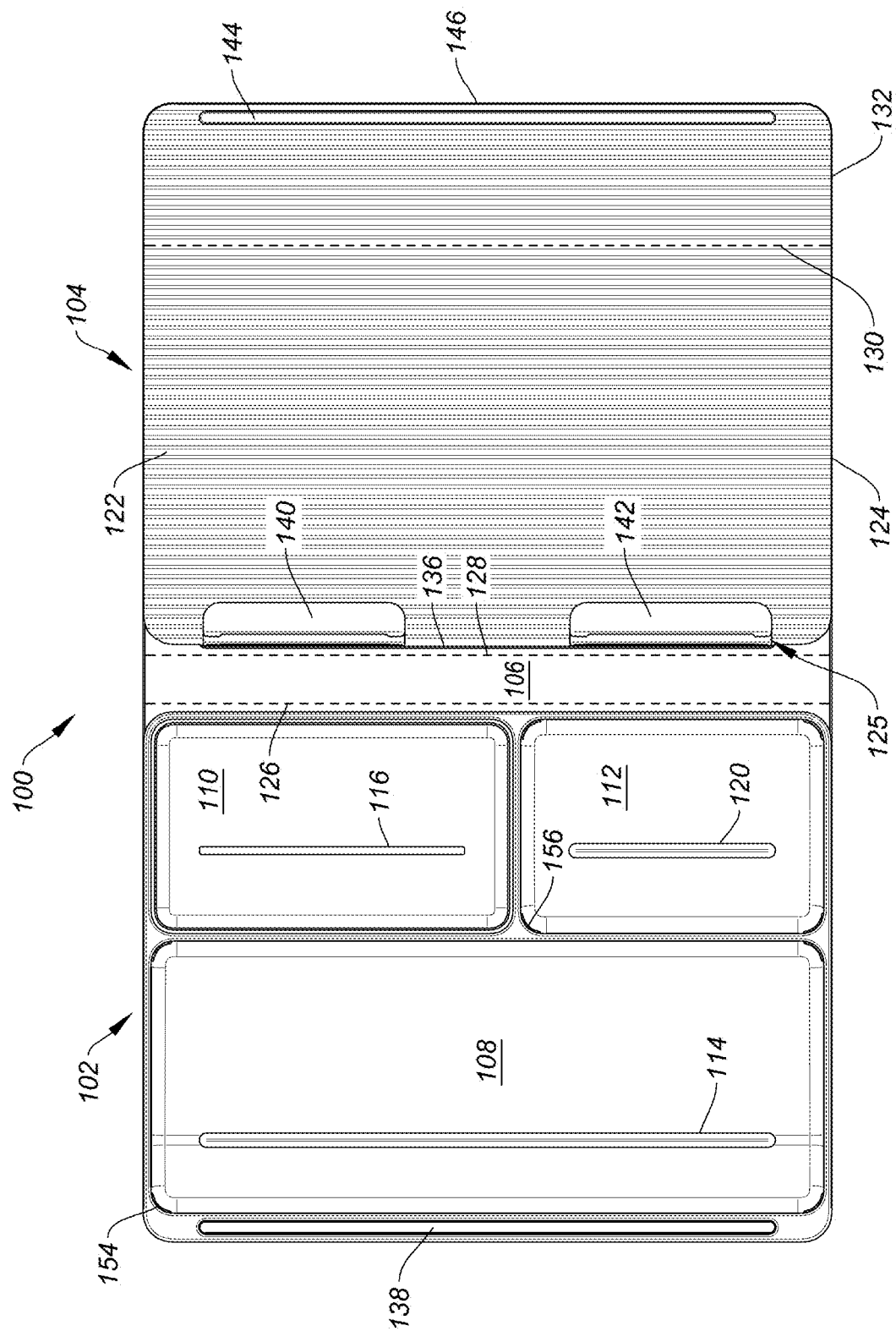
FIG. 1A shows a simplified diagram of an integrated case and stand in an open position according to certain embodiments.

Aspects of the present disclosure relate generally to electronic device cases and stands, and more particularly to cases and stands for computer peripheral devices, according to certain embodiments.

In the following description, various examples of a combined case for computer peripheral devices and a stand for a portable computing device are described. The portable computing device can be any computing device that is portable, such as a laptop computer, a tablet, a smartphone, etc. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to help to prevent any obfuscation of the novel features described herein.

The following high-level summary is intended to provide a basic understanding of some of the novel innovations depicted in the figures and presented in the corresponding descriptions provided below. Aspects of the invention relate to combining a storage case for multiple computer peripherals with a foldable stand for a tablet computer. Thus, a stand "pops up" from the case. The computer peripherals can be placed on a desk in front of the stand with the tablet, thus giving a "pop-up" desk. In embodiments, the computer peripherals are any devices that may be used with a computer, such as a keyboard, a touchpad or track pad, a headset, earbuds, microphones, augmented or virtual reality goggles or glasses, a camera or webcam, gaming controllers, speakers, etc.

Aspects of the invention solve this problem by providing a cover 104 for a case body 102, with the cover comprising an inner panel 122 and outer panel 124 in a unique hinged arrangement for a cover of the case, allowing it to be configured as a stand. An edge of the rotated cover can engage a slot 138 in the case body 102 to hold the stand at an angle, with protruding feet to support the tablet.

It is to be understood that this high-level summary is presented to provide the reader with a baseline understanding of some of the novel aspects of the present disclosure and a roadmap to the details that follow. This high-level summary in no way limits the scope of the various embodiments described throughout the detailed description and each of the figures referenced above are further described below in greater detail and in their proper scope.

FIG. 1A shows an example of a simplified diagram of an integrated case and stand (peripheral platform) 100 in an open position according to certain embodiments. It is basically a folio, like a book that closes. A case body 102 and a cover 104 are joined by an edge panel 106. Edge panel 106 is like the spine of a book. Case body 102 includes three compartments 108, 110 and 112. In alternate embodiments, it may contain 2 compartments or 4 or more compartments, and the compartments could be of different sizes and shapes. Compartment 102 is sized to provide a snug fit for a computer keyboard, while compartment 112 is sized to fit a touchpad. In one embodiment, both the keyboard and touchpad are wireless. Alternately, a mouse or other peripheral could be placed in compartment 112. Compartment 110 is provided with an internal lid (not shown in this view), so that it can contain small, loose items such as cables (for recharging wireless keyboard, touchpad, other peripherals), a battery, earbuds/headphones, etc. A battery could be provided to charge the keyboard and touchpad while they are in the case, with contacts/pins (e.g, pogo pins) or inductive (e.g., Qi) charging pads in the compartments to contact the keyboard or touchpad at the charging connections. Alternately, or in addition, an external connector to power can be provided, and connected to charging pins in compartments 108 and 112. The external connector could be a USB or other connector. Alternately, multiple connectors could be provided, such as connectors for the popular types of smartphones, so the user could use a smartphone charging cable. In another embodiment, an inductive plate is mounted on the bottom of case 102, so it can be places over an inductive charging pad (e.g., Qi wireless charging) to charge the peripherals. Thus, a single connection can be used to charge both a keyboard and a touchpad. Additionally, charging could be provided for a headset, earbuds, or other devices placed in compartment 110.

Compartments 108 and 112 contain low-rise ridges 114 and 120, respectively, to enable removal of the peripheral devices. The use of these ridges will be described with respect to subsequent figures. An optional divider 116 is provided in compartment 110.

Figure 2:
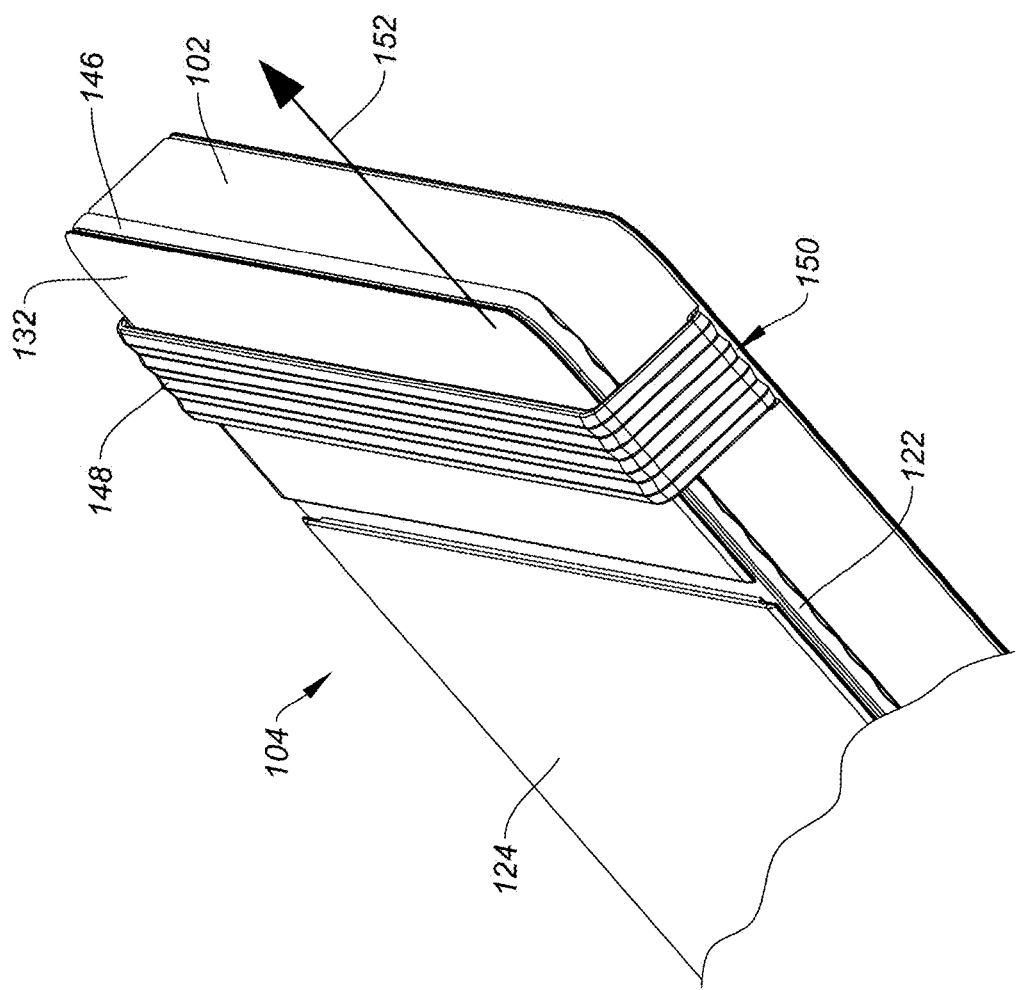
FIG. 2 shows a simplified diagram of an integrated case and stand in a closed position, according to certain embodiments.

Cover 104 includes multiple panels. An inner panel 122 will cover case body 102 when folded over in a closed position as shown in FIG. 2. Outer panels 124 and 132 are on the outside of inner panel 122, joined by a hinge 130 (shown in phantom because it is below panel 122. There are three hinges, indicated by dashed lines. Hinges 126 and 128 allow cover 104 to fold over and cover case body 102. A hinge 130 allows outer panel 124 to bend away from outer panel 132, which remains attached to inner panel 122 as cover 104 is rotated to form a stand as shown in FIG. 3.

Figure 1B:
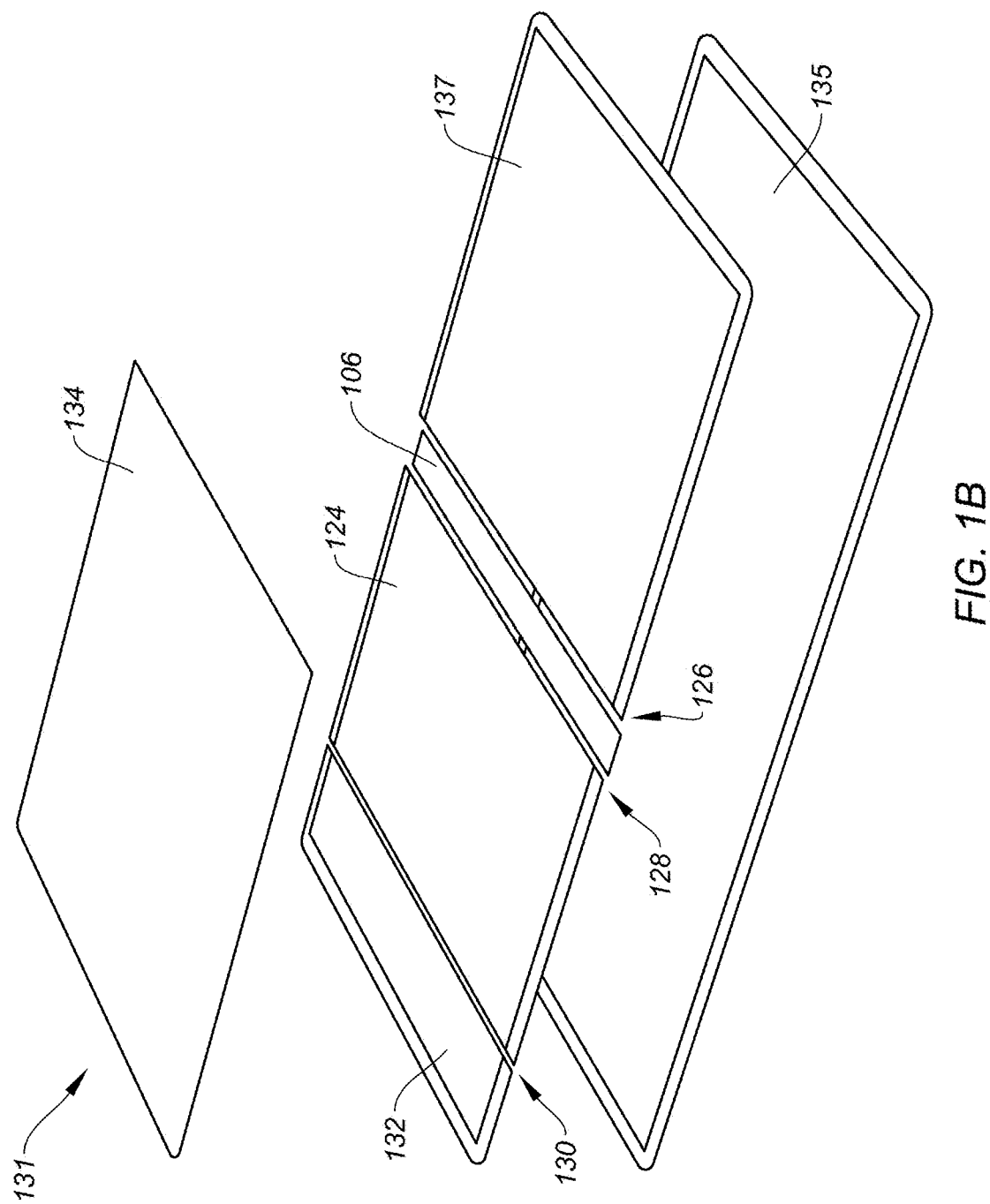
FIG. 1B is an exploded view of the panels of FIG. 1A and covers for the panels, providing a covered outer panel structure, according to embodiments.
Figure 1C:
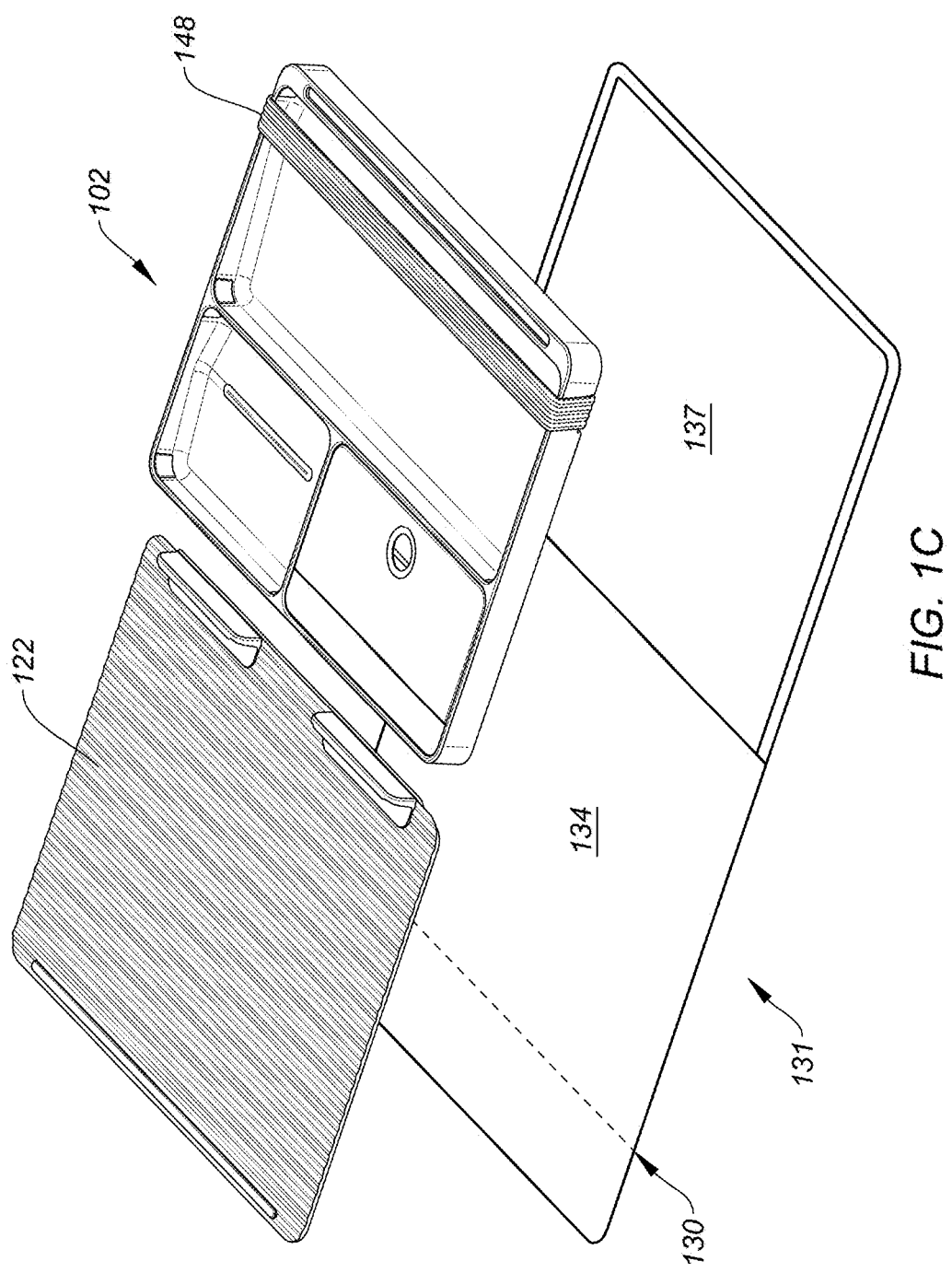
FIG. 1C is an exploded view of the covered outer panel structure of FIG. 1B, adding an inner panel and case body.

FIG. 1B is an exploded view of the panels of FIG. 1A and covers for the panels, providing a covered outer panel structure 131, according to embodiments. Cover 104 consists of panels 124 and 132 shown in FIG. 1B, and panel 122 is shown in FIG. 1C. Panels 132 and 124 are separated by a hinge (gap) 130. Panel 124 is separated from edge panel 106 by a hinge (gap) 128. A third panel 137, which will support case body 102 of FIG. 1A, is separated from edge panel by a hinge (gap) 126. Panels 132, 124 and 137 are made of polycarbonate in one embodiment. Alternately, they can be made of any hard plastic or other stiff material. In one embodiment, edge panel 106 is a thin polyester, such as a Mylar® polyester. Alternately, it could be plastic or another material. All 4 panels are covered on the bottom by a fabric 135, such as a polyurethane fabric. A top fabric 134 covers panels 132, 124, 106 and a small portion of panel 137. The hinges are formed by the top and bottom fabric over the gaps, which allows the fabric to bend between the panels.

FIG. 1C is an exploded view of the covered outer panel structure of FIG. 1B, adding inner panel 122 and case body 102. Inner panel is glued to fabric 134 only at the portion beyond hinge 130, so that it is attached to panel 132 as shown in FIG. 1B. The bulk of panel 122 is not attached, allowing it to rotate outward as shown in FIG. 3. Case body 102 is glued to panel 137, and also a small portion of fabric 134, so that fabric 134 extends partially under case body 102. A strap 148 is attached to case body 102 to secure the cover 104 over it in the closed position, as shown in FIG. 2. In one embodiment, case body 102 is made of a thermoplastic polymer, such as ABS (Acrylonitrile Butadiene Styrene). In one embodiment, the ABS is Post-Consumer Recycled (PCR) or recycled material. Alternately, the base body can be ABS polycarbonate or another plastic material, or any other material with sufficient strength and rigidity.

Figure 3:
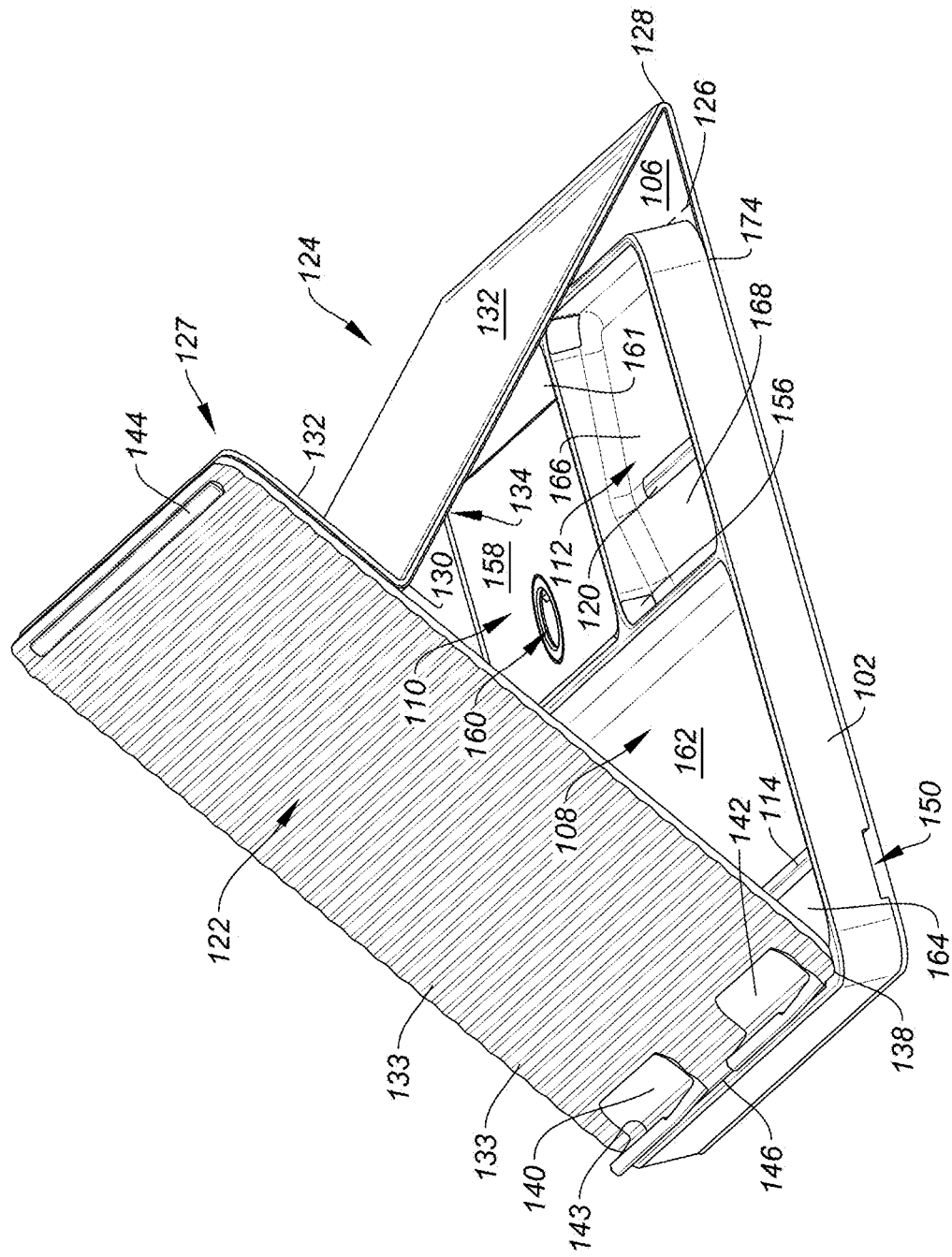
FIG. 3 shows a perspective view of an integrated case and stand configured as a stand for a portable computing device, according to certain embodiments.

Returning to FIG. 1A, an inner edge 136 of inner panel 122 can be lifted and placed in a slot 138 at the opposite edge of case body 102 to form a stand for the portable computing device as shown in perspective view in FIG. 3. In one embodiment, inner panel 122 can have an extending lip 125, that is narrower than the width of inner panel 122, to engage with a slot or recess 138 that is narrower than the width of inner panel 122. Lip 125 can have magnets that engage with magnets below recess 138. Alternately, metal strips can be used instead of the magnets embedded in lip 125, with magnets below recess 138, or vice-versa. The magnetization can be slight, to help the user locate the recess with lip 125. In one embodiment, the magnets are strong enough to help the user locate the recess, but will release the stand from the connected position (shown in FIG. 3) if the user lifts the stand, to avoid a false sense of security.

A pair of protrusions 140 and 142 are small ledges or feet to support the portable computing device. A raised strip 144 near edge 146 of inner panel 122 provides support for a top of the portable computing device, while lifting the computing device slightly away from top panel 122 to allow air circulation for cooling. In one embodiment, strip 144 is magnetic, to provide a further holding force for a tablet or other portable computing device. Strip 144 can be sized to fit in slot 138 when in a closed position, to provide better sealing over the case body 102. In one embodiment, the strip 144 and slot 138 can be sized so that the strip snaps into slot 138 to snap closed and hold the cover on the case body.

FIG. 1A shows, in the corners of compartments 108 and 112, compressible pads 154 and 156. These cushions are in each of the four corners of each respective compartment. In one embodiment, the cushions are made of silicone rubber. Alternately, they could be made of foam rubber, polymers, etc. Alternately, other releasable retaining mechanisms could be used, such as clips, elastic straps, or other mechanisms. In another embodiment, instead of a pad, a recess can be built into the sidewall of case body 102. A compressible pad can be inserted into the recess in one embodiment. Alternately, compartments 108 and 112 can be fully covered in a soft rubber material, thus eliminating the need for added cushions. In another embodiment, the entire case body 102 can be made of a rubber or other softer material.

FIG. 2 shows a simplified diagram of an integrated case and stand in a closed position, according to certain embodiments. Cover 104, with Inner panel 122 and outer panels 124 and 132, covers case body 102. In one embodiment, an elastic (silicone) band 148 is used to secure cover 104 to case body 102. Elastic band 148 is secured in a slot 150 in case body 102 on two sides. Elastic band 148 can be stretched and pulled in a direction 152 past the edge 146 of top cover 104 and case body 102 to lift the top cover off, and place it over, the case body. In alternate embodiments, band 148 is an elasticated webbing.

FIG. 3 shows a perspective view of an integrated case and stand configured as a stand for a portable computing device, according to certain embodiments. As can be seen, outer panel 132 bends relative to panel 124 along hinge 130, and panel 124 bends relative to panel 106 along hinge 128 to rotate inner panel 122 more than 90 degrees to the position shown where edge 136 engages with slot 138 in the case body 102. In the embodiment shown, inner panel 122 is rotated or articulated about 135 degrees from its position shown in FIG. 2 as a cover over case body 102, and about 45 degrees, and lifted about ½-2 inches from the open, flat position shown in FIG. 1

In one embodiment, panel 122 is a hard plastic, such as polycarbonate, with a textured top surface to support a tablet. As described in FIG. 1B, outer fabric 135 extends along the bottom of case body 102, continues along panels 124 and 132, and ends at end 127. The inner fabric 134 extends from a line 174 below case body 102, along panel 124, and up to point 127. The fabric is glued to the various plastic panels in one embodiment. The hinges 126, 128 and 130 are formed where there is a gap between two plastic panels, and the two fabric covers provide the flexibility to bend. This is similar to the hinges on books with a cardboard covered with fabric. In alternate embodiments, the hinges 126, 128 and 130 can be made in a variety of other ways. In one embodiment, the panels have an internal stiff plate, such as a hard plastic. This is covered by a flexible membrane, such as a soft, bendable polymer or cloth fabric. The hinges may be formed by simply having a gap between the internal stiff plates. A large plate could be used for inner panel 122, and a narrow plate for hinge panel 106. It may be desirable to have hinge 126 be firmer for the stand configuration of FIG. 3. Thus, a friction hinge could be used in one embodiment, such as the friction hinges described in Logitech US Published Application No. 20160134322, the disclosure of which is hereby incorporated herein by reference.

In embodiments, an integrated light source can be provided for lighting up a user when the user is using a camera in a tablet for a video call. Light strips can be imbedded in one or more of the edges of panel 122. Because the panels will not be pointing at the users face when arranged as a stand, the light strips can be mounted at an angle, or lenses can be placed over the light strips to redirect the light toward the user. Alternately, instead of light strips, one light or a series of lights can be used. Alternately, a light fixture can be mounted on an arm attached to panel 122 or elsewhere. The arm rotates and pivots to aim the light at the user. A switch can be mounted on the face of panel 122 or elsewhere, to activate the light when the case is opened FIG. 3 shows a cover 158 for compartment 110. There is a fingerhole 160 in cover 158 so a user can lift cover 158 to access compartment 110 and its contents. The cover 158 has a hinge 161 near the back of the compartment, so that only the front portion of the cover is lifted using fingerhole 160, with the rest of the cover remaining attached to case body 102. Hinge 161 is a line hinge in one embodiment—a thin part of the molded plastic cover 158, allowing bending beyond 90 degrees. The attachment of cover 158 to case body 102 prevents the cover from being lost. Alternately, the cover could be completely removable. In an alternate embodiment, the cover can be eliminated. Other mechanisms for opening the cover could be used as well, such as an attached handle or strap that folds down.

In one alternate embodiment, a tablet computer can be placed above compartments 108, 110 and 112. This area can be formed by simply raising the sides of case body 102.

Inner panel 122 has a series of small ridges 133 to provide a roughened or texturized plastic surface. In one embodiment, the ridges may provide an air channel between each ridge for cooling purposes. The outer surface material of inner panel 122 can also be a high friction material the keeps the tablet from slipping, such as a fabric cover or a rubber or polymer or softer plastic.

A pair of protrusions 140 and 142 on inner panel 122 are small L-shaped ledges or feet to support the bottom edge of the portable computing device. A small inward lip 143 prevents the portable computing device from slipping out. These ledges or feet can be glued or otherwise attached to inner panel 122. These feet can be rubber, or plastic covered with rubber. The distance between the portion of the L-shaped ledge attached to inner panel 122 and lip 143 is sized to fit the thickness of the portable computing device, with a slight gap for ease of insertion and removal. Alternately, a tight fit can be provided, so the portable computing device is snapped into place and securely held. In another alternate embodiment, protrusions 140 and 142 could be a single protrusion, or could be three or more protrusions. The protrusions could be integral with inner panel 122, forming an upward ridge on the panel.

Compartment 108 as shown in FIG. 3 has a ridge 114 dividing two downward sloping regions 162 and 164. The downward slope of region 162 accommodates the triangular shape of a keyboard. The downward slope of region 164, is designed to provide a space under the keyboard when it is wedged into compartment 108 and under compression force from corner pads 154. Thus, a user can press down on the keyboard over region 164, causing it to pivot downward around ridge 114 at that end, while the other end of the keyboard pivots up, releasing it from the corner cushions. Then the user can grab the free end and remove the keyboard. This is shown in more detail in FIG. 7, discussed below.

As shown, a similar structure is provided in compartment 112. A ridge 120 divides the floor of compartment 112 into two downward sloping regions 166 and 168. The downward slope of region 166 accommodates the triangular shape of a touchpad. The downward slope of region 168, is designed to provide a space under the touchpad when it is wedged into compartment 112 and under compression force from corner cushions 156.

Ridges 114 and 120 can be covered with a strip of a separate material from the bottom surface of the compartments. In one embodiment, the compartment bottom (and walls) are a hard plastic, while ridges 114 and 120 are a compressible material, such as rubber, to keep the keyboard or touchpad from sliding as it is levered up, and for a bit of cushioning. Alternately, the entire bottom of the compartments can be a compressible material.

In one embodiment, the bottom of slot 138 is formed of a compressible material, such as foam, to better hold the edge of inner panel 122.

Figure 4:
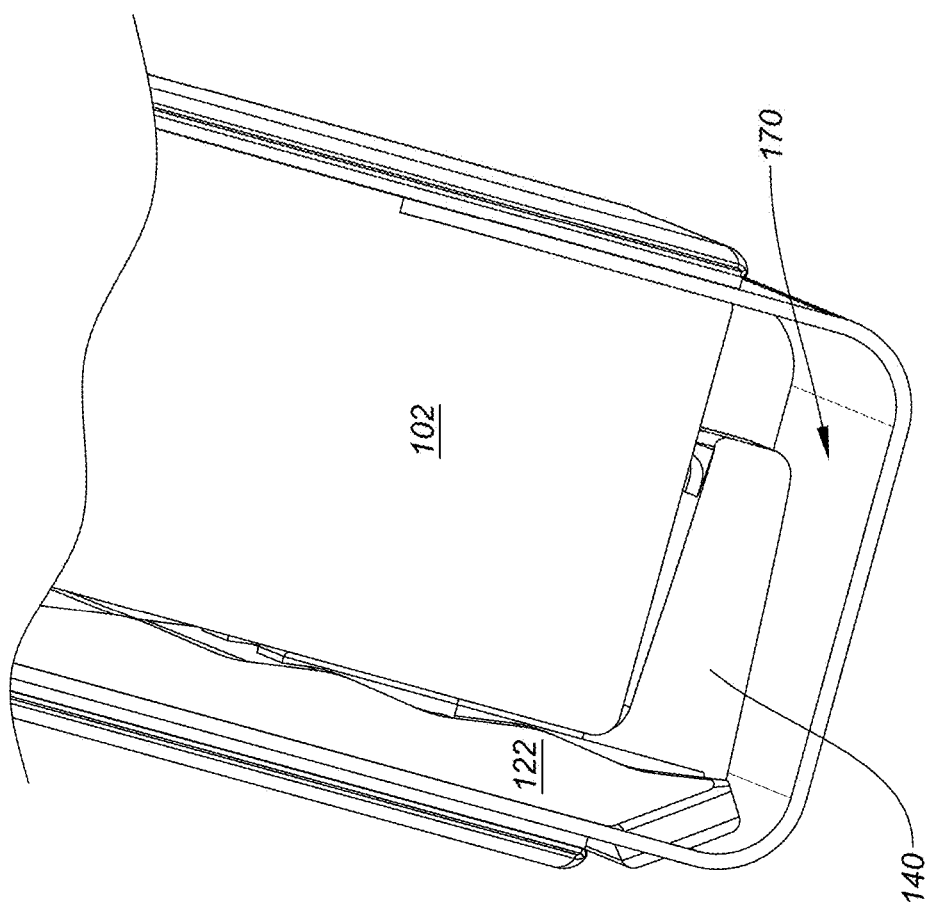
FIG. 4 shows a cut-away view of the integrated case and stand in a closed position, illustrating the portion where the feet engage the case body, according to certain embodiments.

FIG. 4 shows a cut-away view of the integrated case and stand in a closed position, illustrating the portion where the feet engage the case body, according to certain embodiments. In an alternate embodiment, foot (protrusion or ledge) 140 as shown compresses against the side of case body 102 to snap into place and hold panel 122 fixed as a cover to case body 102. A gap 170 is provided to allow room for ledge 140 to move into place. Alternately, feet 140, 142 could go inside case body 102, with the case body being long enough to accommodate them. In another variation, notches could be provided on either the outside or inside wall of case body 102 to provide a space for feet 140, 142.

Figure 5:
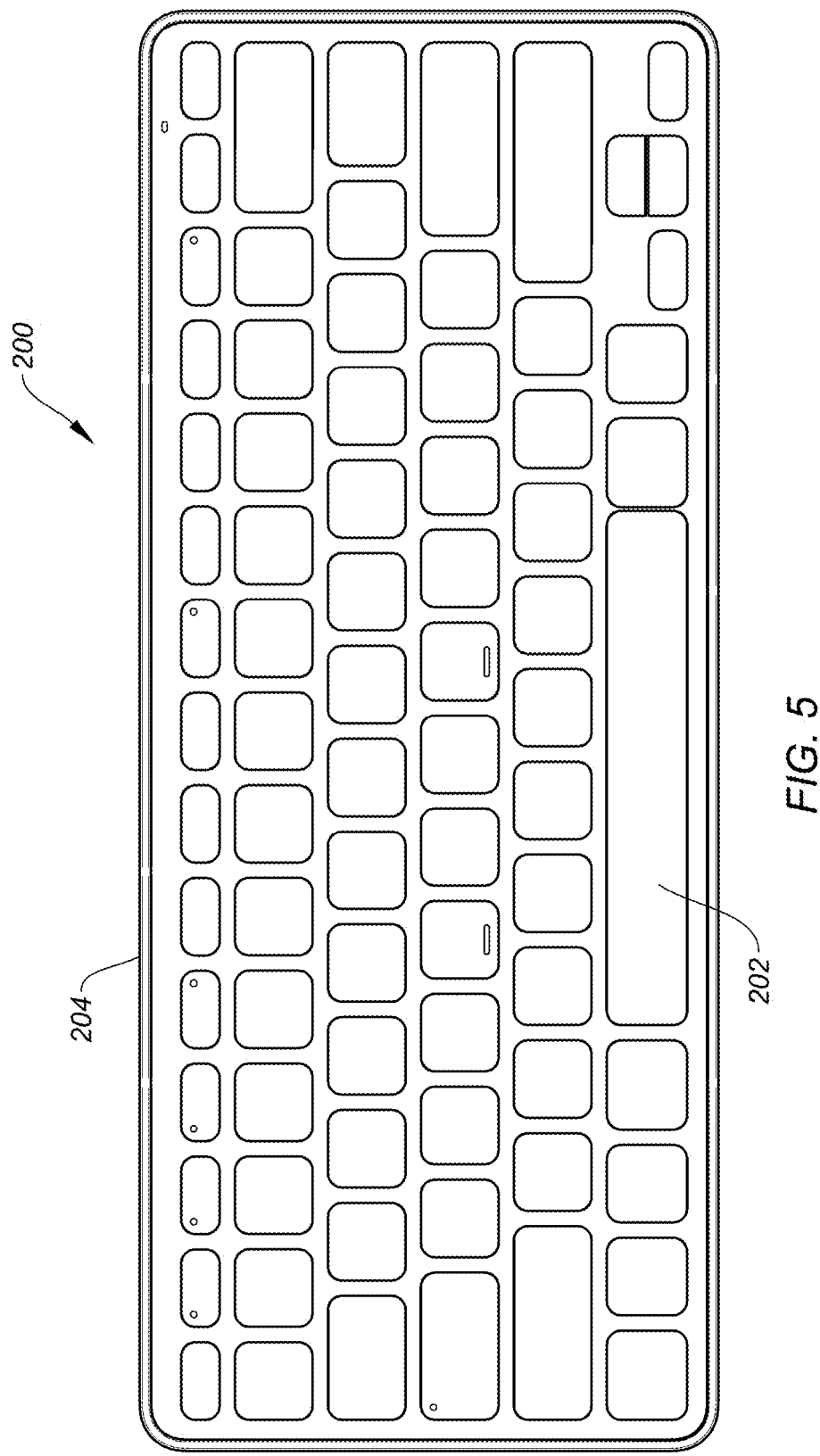
FIG. 5 is a perspective view of a keyboard for placement into a compartment of the integrated case and stand, according to certain embodiments.

FIG. 5 is a perspective view of a keyboard 200 for placement into compartment 108 of the integrated case and stand 100, according to certain embodiments. To remove keyboard 200, the use can press down in the area of space bar 202, causing the keyboard to pivot about ridge 114, and lifting the back side 204 of the keyboard to where the user can grasp and remove the keyboard.

Figure 6:
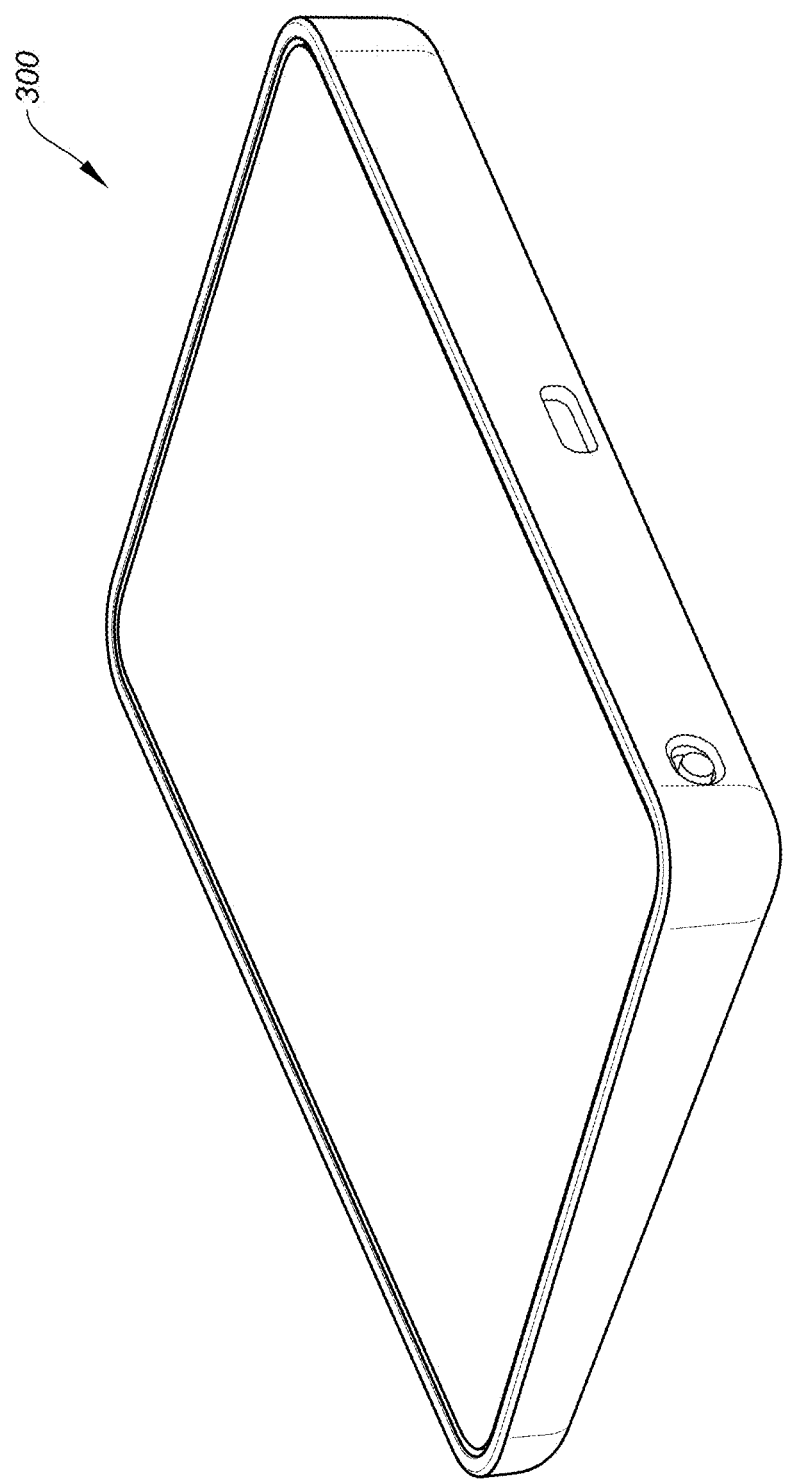
FIG. 6 is a perspective view of a touchpad for placement into a compartment of the integrated case and stand, according to certain embodiments.

FIG. 6 is a perspective view of a touchpad 300 for placement into compartment 112 of the integrated case and stand 100, according to certain embodiments. As for the keyboard, the user can press a close end of touchpad 200 to cause it to pivot about ridge 120, lifting the opposite end so the user can grasp and remove the touchpad.

Figure 7:
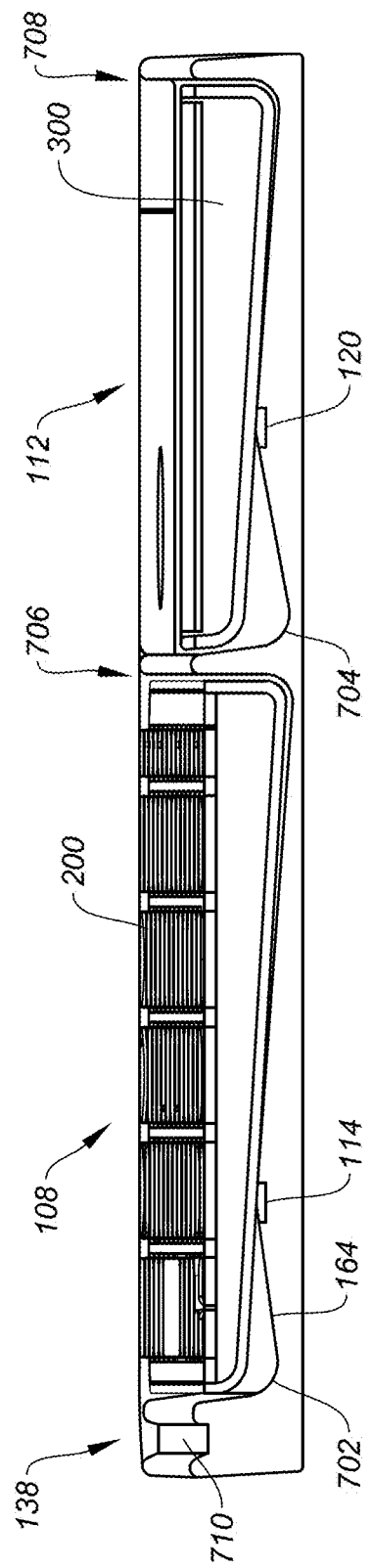
FIG. 7 is a side, cutaway view of a case body showing the keyboard and touchpad compartments, according to certain embodiments.

FIG. 7 is a side, cutaway view of a case body showing the keyboard and touchpad compartments, according to certain embodiments. Keyboard compartment 108 contains keyboard 200, and touchpad (trackpad) compartment 112 has touchpad 300. Rubber ridges 114 and 120 can be seen, along with gaps below the keyboard and touchpad at positions 702 and 704, respectively. As can be seen, the depth of keyboard compartment 108 at position 702 is slightly more than the width of the keyboard at far end 706. Thus, pressing down on the space bar of keyboard 200 will push the front end to the bottom of the compartment at position 702, lifting far end out of the compartment sufficiently for a user to grasp far end 706. The ridge 114 is closer to position 702 than the middle of compartment 108 to provide sufficient leverage. In one embodiment, it is between ¼ to ⅓ of the total distance from front to back of keyboard compartment 108 from position 702.

Touchpad compartment 112 similarly has a rubber ridge 120 to allow touchpad 300 to be popped out by pressing down on the front edge of the touchpad to lift the back edge above the top of the compartment so a user can grasp it. In this embodiment, rubber ridge 120 is closer to the center of compartment 112, giving less leverage. To make up for this, and provide enough leverage, the depth at position 704 is deeper than at position 702. Other variations in depth and the position of the ridge can be used to provide equivalent leverage.

In one embodiment, a magnet or metal 710 is embedded below slot 138 to engage with a metal or magnet in the edge 146 of panel 122 as shown in FIGS. 1 and 3. This attracts panel 122 to help the user locate it in the slot 138.

In one embodiment, the keyboard and touchpad are wireless. When the user presses down on the space bar of the keyboard, or the touch surface of the touchpad to cause a click, pairing with the user's tablet will be initiated, if the keyboard and touchpad have power on. In one embodiment, a magnet is mounted in the case to engage the keyboard at the correct position to place it into an ultra-low power state when inserted into the compartment and the case is closed. Certain keyboards are designed to go into an ultra low-power mode when a cover is placed over the keyboard, with a magnet in the cover engaging a metal piece on the keyboard (or vice-versa). The magnetic connection is detected in the keyboard, and used to place it into an ultra low-power mode. Similarly, removing the keyboard can be detected to activate the keyboard, or to place it in a normal low power mode, awakening it enough from the ultra low-power mode to detect clicks and perform certain functions.

In embodiments, the case body includes embedded speakers that can be wirelessly connected to a user's tablet or another user device, such as a smartphone. In one embodiment, speakers are mounted on the sides of case body 102. In another embodiment, the speaker or speakers are mounted on the bottom of compartments 108 and/or 112. Alternately, the speakers can be embedded in panels 122 or 124.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

What is claimed is:

1. A peripheral platform comprising:
   a case body including:
   a first compartment configured to hold a first computer peripheral;
   a second compartment configured to hold a second computer peripheral;
   a lid covering the first and second compartments in a closed position, the lid having at least a portion that rotates more than 90 degrees to form a stand, at an angle to the case body, for a portable computing device in an open position; and
   retaining mechanisms mounted in a plurality of corners of the first compartment.

2. The peripheral platform of claim 1 wherein the first compartment is sized to hold a keyboard, and the second compartment is sized to hold a touchpad.

3. The peripheral platform of claim 1 further comprising:
   a lip mounted on one end of the lid to support the portable computing device in the open position; and
   a hinge panel connecting a bottom of the case body to the lid, the hinge panel being sufficiently wide to allow the lid to fold over a top of the case body, with sufficient space for the lip to be located between an outside of the case body and the hinge panel in the closed position.

4. A peripheral platform comprising:
   a case body including:
   a first compartment configured to hold a first computer peripheral;
   a second compartment configured to hold a second computer peripheral; and
   a lid covering the first and second compartments in a closed position, the lid having at least a portion that rotates more than 90 degrees to form a stand, at an angle to the case body, for a portable computing device in an open position;
   wherein the lid comprises:
   a first panel having a first surface configured to hold the portable computing device, the first surface facing inward when the integrated case and stand is in the closed position, and the first surface facing outward when the integrated case and stand is configured in the open position as a stand; and
   a second panel and a third panel at least co-extensive with the first panel, and having a first hinge between the second and third panels less than half a distance from a first edge of the first panel, the first hinge allowing the portion of the first panel to pivot away from the second panel for the open position.

5. The peripheral platform of claim 4 wherein the first surface is a textured surface, and the first panel further comprises a lip at a second edge of the first panel configured to support the portable computing device.

6. The peripheral platform of claim 5 wherein the textured surface comprises a patterned surface of a hard plastic.

7. A peripheral platform comprising:
   a case body including:
   a first compartment configured to hold a first computer peripheral;
   a second compartment configured to hold a second computer peripheral; and
   a lid covering the first and second compartments in a closed position, the lid having at least a portion that rotates more than 90 degrees to form a stand, at an angle to the case body, for a portable computing device in an open position;
   wherein the first compartment has a ridge on a bottom surface, the ridge being sufficiently high to allow a user to push down on a first end of the first computer peripheral to lift a second end of the first computer peripheral so that it can be removed from the first compartment.

8. The peripheral platform of claim 1 wherein the retaining mechanisms comprise compressible pads.

9. A peripheral platform comprising:

a case body including:

a first compartment configured to hold a first computer peripheral;

a second compartment configured to hold a second computer peripheral;

a lid covering the first and second compartments in a closed position, the lid having at least a portion that rotates more than 90 degrees to form a stand, at an angle to the case body, for a portable computing device in an open position;

a lip mounted on one end of the lid to support the portable computing device in the open position;

a hinge panel connecting a bottom of the case body to the lid, the hinge panel being sufficiently wide to allow the lid to fold over a top of the case body, with sufficient space for the lip to be located between an outside of the case body and the hinge panel in the closed position;

a first panel having a first surface configured to hold the portable computing device, the first surface facing inward when the integrated case and stand is in the closed position, and the first surface facing outward when the integrated case and stand is configured in the open position as a stand;

a second panel and a third panel at least co-extensive with the first panel, and having a first hinge between the second and third panels less than half a distance from a first edge of the first panel, the first hinge allowing the portion of the first panel to pivot away from the second panel for the open position;

a second hinge joining a bottom panel of the case body to the hinge panel; and a third hinge joining the hinge panel to the second panel.

10. The peripheral platform of claim 9 wherein:

the first, second and third hinges are formed with a fabric covering on two sides of gaps between the panels.

11. The peripheral platform of claim 9 wherein:

the first panel comprises a plastic; and the second panel comprises a plastic panel covered by a fabric.

12. An peripheral platform comprising:

a case body including:

a first compartment configured to hold a first computer peripheral, wherein the first compartment has a ridge on a bottom surface, the ridge being sufficient high to allow a user to push down on a first end of the first computer peripheral to lift a second end of the first computer peripheral so that it can be removed from the first compartment;

a second compartment configured to hold a second computer peripheral;

a lid covering the first and second compartments in a closed position, the lid having at least a portion that rotates more than 90 degrees to form a stand, at an angle to the case body, for a portable computing device in an open position;

a lip mounted on one end of the lid to support the portable computing device in the open position;

wherein the lid comprises:

a first panel having a surface configured to hold the portable computing device, the first surface facing inward when the integrated case and stand is in the closed position, and the first surface facing outward when the integrated case and stand is configured in the open position as a stand;

a second panel and a third panel at least co-extensive with the first panel, and having a first hinge between the second and third panels less than half a distance from a first edge of the first panel, the first hinge allowing the portion of the first panel to pivot away from the second panel for the open position.

13. The peripheral platform of claim 12 wherein the first surface comprises a patterned hard plastic.

14. The peripheral platform of claim 12 further comprising retaining mechanisms mounted in a plurality of corners of the first compartment.

15. The peripheral platform of claim 14 wherein the retaining mechanisms comprise compressible pads.

16. A computer peripheral case comprising:

a case body including:

a first compartment configured to hold a first computer peripheral;

a second compartment configured to hold a second computer peripheral;

a compression mechanism in the first compartment for a compression fit of the first computer peripheral in the first compartment; and a ridge on a bottom surface of the first compartment, the ridge being sufficient high to allow a user to push down on a first end of the first computer peripheral to lift a second end of the first computer peripheral so that it can be removed from the first compartment; and a portion of the bottom surface on at least one side of the ridge sloping downward.

17. The case of claim 16 wherein the compression mechanism comprises retaining mechanisms mounted in a plurality of corners of the first compartment.

18. The case of claim 17 wherein the retaining mechanisms comprise compressible pads.

19. The case of claim 16 wherein the ridge is a strip of compressible rubber, and the bottom surface of the first compartment is a hard plastic.

* * * * *